United States Patent
Deguchi et al.

(10) Patent No.: US 10,790,705 B2
(45) Date of Patent: Sep. 29, 2020

(54) POWER TRANSMISSION DEVICE

(71) Applicant: PANASONIC CORPORATION, Osaka (JP)

(72) Inventors: Futoshi Deguchi, Fukuoka (JP); Souichi Kawata, Fukuoka (JP); Kazuhiro Eguchi, Fukuoka (JP); Katsuya Okamoto, Fukuoka (JP); Yoshio Koyanagi, Kanagawa (JP); Ryosuke Hasaba, Kanagawa (JP)

(73) Assignee: PANASONIC CORPORATION, Osaka (JP)

( * ) Notice: Subject to any disclaimer, the term of this patent is extended or adjusted under 35 U.S.C. 154(b) by 94 days.

(21) Appl. No.: 16/314,139

(22) PCT Filed: Jun. 19, 2017

(86) PCT No.: PCT/JP2017/022515
§ 371 (c)(1),
(2) Date: Dec. 28, 2018

(87) PCT Pub. No.: WO2018/003568
PCT Pub. Date: Jan. 4, 2018

(65) Prior Publication Data
US 2019/0229557 A1    Jul. 25, 2019

(30) Foreign Application Priority Data

Jun. 30, 2016  (JP) ................................ 2016-130997

(51) Int. Cl.
*H02J 50/12*     (2016.01)
*H02J 50/50*     (2016.01)
(Continued)

(52) U.S. Cl.
CPC .............. *H02J 50/12* (2016.02); *B60L 53/12* (2019.02); *B60L 53/31* (2019.02); *H01F 38/14* (2013.01);
(Continued)

(58) Field of Classification Search
None
See application file for complete search history.

(56) References Cited

U.S. PATENT DOCUMENTS 10,181,729 B1 *  1/2019  DeVaul ................... H02J 50/80
2005/0057422 A1    3/2005  Deguchi et al.
(Continued)

FOREIGN PATENT DOCUMENTS

| JP | 2005-102101 | 4/2005 |
|---|---|---|
| JP | 2015-015901 | 1/2015 |

(Continued)

OTHER PUBLICATIONS

Office Action dated Apr. 7, 2020 in corresponding Japanese Patent Application No. 2016-130997 and an English translation thereof.
(Continued)

*Primary Examiner* — Jared Fureman
*Assistant Examiner* — Joel Barnett
(74) *Attorney, Agent, or Firm* — Greenblum & Bernstein, P.L.C.

(57) ABSTRACT

A power transmission device transmits power underwater to a power reception device including a power reception coil. The power transmission device includes: a power transmission coil that transmits power to the power reception coil through a magnetic field; a power transmitter that transmits an alternating current power having a predetermined frequency to the power transmission coil; and a first capacitor that is connected to the power transmission coil and forms a resonance circuit resonating with the power transmission (Continued)

coil. The predetermined frequency is a frequency between a first frequency at which a geometric mean value of a Q value of the power transmission coil and a Q value of the power reception coil are the maximum and a second frequency at which the Q value of the power transmission coil and the Q value of the power reception coil are the same.

5 Claims, 10 Drawing Sheets

(51) Int. Cl.
  *B60L 53/12* (2019.01)
  *B60L 53/31* (2019.01)
  *H02J 50/80* (2016.01)
  *H01F 38/14* (2006.01)
  *B63C 11/00* (2006.01)
  *H02J 7/02* (2016.01)
(52) U.S. Cl.
  CPC .............. *H02J 50/50* (2016.02); *H02J 50/80* (2016.02); *B60L 2200/32* (2013.01); *B63C 11/00* (2013.01); *H02J 7/025* (2013.01)

(56) References Cited

U.S. PATENT DOCUMENTS

| | | |
|---|---|---|
| 2014/0232200 A1 | 8/2014 | Maekawa |
| 2015/0303702 A1 | 10/2015 | Tanomura et al. |
| 2015/0365066 A1* | 12/2015 | Tanomura ............... H02J 7/025 307/104 |
| 2016/0013664 A1* | 1/2016 | Maekawa ............. B60L 53/124 307/104 |
| 2018/0215277 A1 | 8/2018 | Deguchi et al. |

FOREIGN PATENT DOCUMENTS

| | | |
|---|---|---|
| WO | 2014/034491 A1 | 3/2014 |
| WO | 2015/087724 A1 | 6/2015 |
| WO | 2017/013825 A1 | 1/2017 |

OTHER PUBLICATIONS

Burhan Gulbahar, Ozgur B. Akan, "A Communication Theoretical Modeling and Analysis of Underwater Magneto-Inductive Wireless Channels", IEEE Transactions on Wireless Communications, vol. 11, No. 9, Sep. 2012, pp. 3326-3334.

Futagami et al., "Creation of industrial value of sea floor by implementation of undersea wireless power transfer", Proceedings of the Society Conference of IEICE 1, Sep. 8, 2015, pp. S62-S63.

Hasaba et al., "Study of wireless power transmission for under seawater using EM simulation", Proceedings of the 2016 IEICE General Conference Tsushin 1, Mar. 15, 2016, p. 681.

Official Communication issued in International Pat. Appl. No. PCT/JP2017/022515, dated Aug. 1, 2017.

* cited by examiner

POWER TRANSMISSION DEVICE

TECHNICAL FIELD

The present disclosure relates to a power transmission device that wirelessly transmits power underwater.

BACKGROUND ART

In the related art, a technique of contactlessly transmitting power between an underwater base station as a power transmission device and an underwater vehicle as a power reception device by means of magnetic resonance is known (for example, refer to Patent Literature 1). The power transmission device includes a power transmission resonance coil, a balloon, and a balloon control mechanism. The power transmission resonance coil contactlessly transmits power to a power reception resonance coil of the power reception device by means of magnetic field resonance. The balloon houses the power transmission resonance coil. The balloon control mechanism causes the balloon to inflate during power transmission such that water between the power transmission resonance coil and the power reception resonance coil is removed.

In addition, an antenna device that transmits power and data to an IC-integrated medium by electromagnetic induction utilizing a frequency band of 13.56 MHz is known (for example, refer to Patent Literature 2). The antenna device includes: at least one power-fed loop antenna to which a signal current is supplied; and at least one non-power-fed loop antenna to which a signal current is not supplied, in which a signal current is generated in the non-power-fed loop antenna using a magnetic field generated from the power-fed loop antenna such that the communication range of the power-fed loop antenna expands.

CITATION LIST

Patent Literature

Patent Literature 1: JP-A-2015-015901
Patent Literature 2: JP-A-2005-102101

SUMMARY OF INVENTION

Technical Problem

One index indicating a transmission efficiency of power transmission using magnetic field resonance is a Q value (Quality Factor) of a coil used for power transmission. In the power transmission using magnetic field resonance, a plurality of coils including at least a power transmission resonance coil and a power reception resonance coil are used. The plurality of coils are different in characteristics (coil characteristics) such as size, material, length, or winding number. A Q value of a coil varies depending on coil characteristics. Therefore, in a case where a frequency at which a Q value corresponding to coil characteristics of one coil is obtained is set as a frequency (transmission frequency) used for power transmission, there is a worry that the transmission efficiency of power transmission may be deteriorated.

The present disclosure has been made in consideration of the above-described circumstances and provides a power transmission device capable of improving a transmission efficiency of underwater contactless power transmission to a power reception device.

Solution to Problem

A power transmission device according to the present disclosure transmits power underwater to a power reception device including a power reception coil. The power transmission device includes: a power transmission coil that transmits power to the power reception coil through a magnetic field; a power transmitter that transmits an alternating current power having a predetermined frequency to the power transmission coil; and a first capacitor that is connected to the power transmission coil and forms a resonance circuit resonating with the power transmission coil. The predetermined frequency is a frequency between a first frequency at which a geometric mean value of a Q value of the power transmission coil and a Q value of the power reception coil are the maximum and a second frequency at which the Q value of the power transmission coil and the Q value of the power reception coil are the same.

Advantageous Effects of Invention

According to the present disclosure, a transmission efficiency of underwater contactless power transmission to a power reception device can be improved.

DESCRIPTION OF EMBODIMENTS

Hereinafter, embodiments will be described in detail with reference to the drawings as necessary. Detailed description beyond necessity may be omitted. For example, detailed description of a matter that has been already known well or overlapping description of a substantially identical configuration may be omitted. This is to avoid unnecessary redundancy of the following description and to make those skilled in the art easily understand the present disclosure. Note that the attached drawings and the following description are provided in order that those skilled in the art fully understand the present disclosure, and are not intended to limit the subject matter described in the claims.

First Embodiment

[Configuration]

Figure 1:
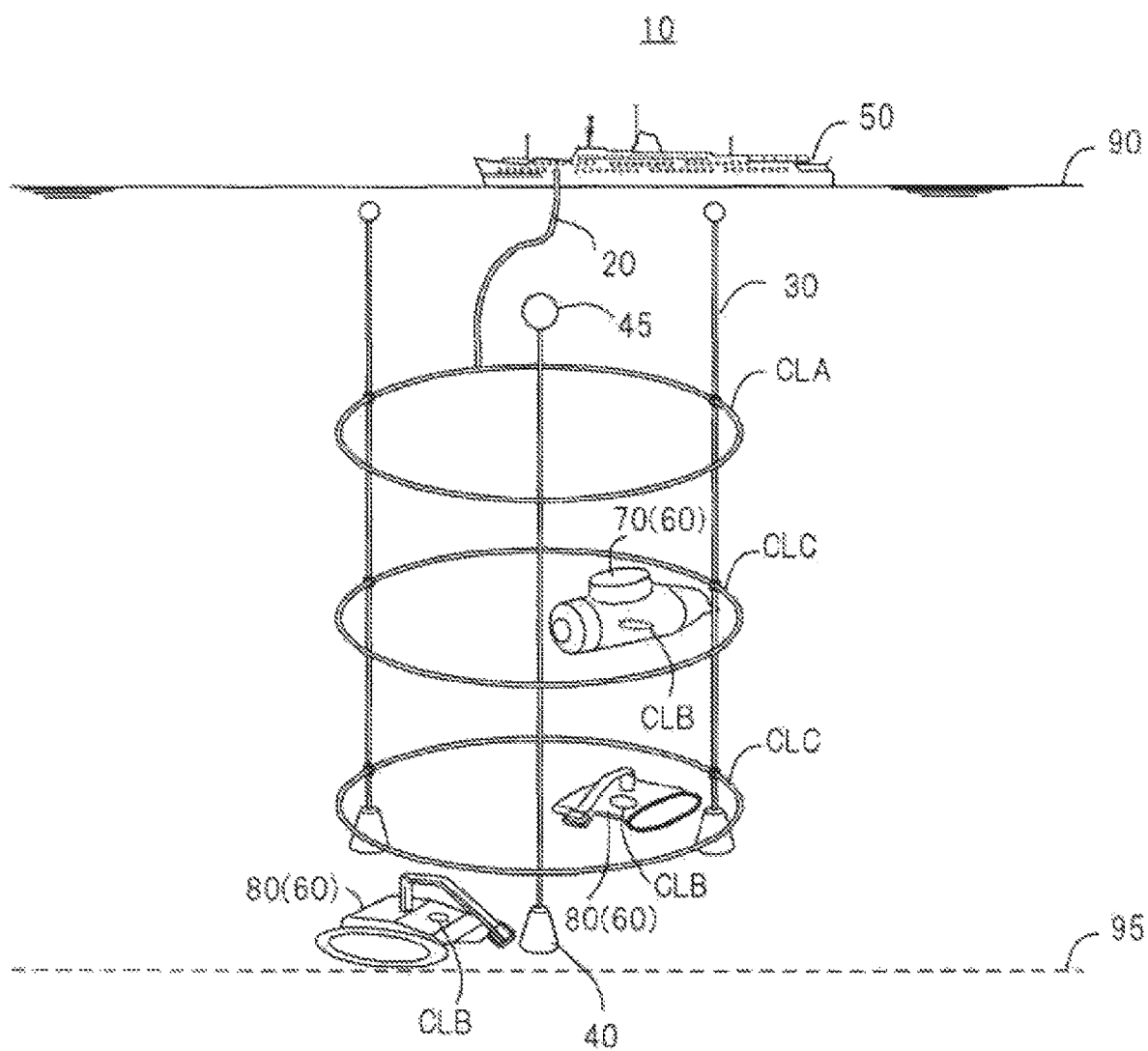
FIG. 1 is a schematic diagram indicating an example of an environment in which a power transmission system according to a first embodiment is provided.

FIG. 1 is a schematic diagram indicating an example of an environment in which a power transmission system 10 according to a first embodiment is provided. The power transmission system 10 includes a power transmission device 100, a power reception device 200, and coils CL (refer to FIG. 2). The power transmission device 100 wirelessly (contactlessly) transmits power to the power reception device 200 through the plurality of coils CL by means of magnetic resonance. The number of disposed coils CL is n which is arbitrary.

The coils CL are formed in, for example, a ring shape and are coated with a resin cover to be insulated. The coils CL are, for example, helical coils or spiral coils. In addition, the coils CL are formed with, for example, cabtire cables. The coils CL include a power transmission coil CLA and a power reception coil CLB. The power transmission coil CLA is a primary coil, and the power reception coil CLB is a secondary coil.

In addition, the coils CL may include one or more repeating coils CLC (booster coils) that are disposed between the power transmission coil CLA and the power reception coil CLB. The repeating coils CLC are disposed substantially parallel to each other, and half or more portions of opening surfaces formed by the repeating coils CLC overlap each other. A distance between the plurality of repeating coils CLC is secured to be greater than or equal to, for example, a radius of the repeating coil CLC. The repeating coils CLC assist power transmission of the power transmission coil CLA.

The power transmission coil CLA is provided in the power transmission device 100. The power reception coil CLB is provided in the power reception device 200. The repeating coils CLC may be provided in the power transmission device 100, may be provided in the power reception device 200, or may be provided separately from the power transmission device 100 and the power reception device 200. A configuration may be adopted in which some of the repeating coils CLC are provided in the power transmission device 100 and other repeating coils CLC are provided in the power reception device 200.

The power transmission device 100 is provided at a ship 50. The power reception device 200 is provided at an underwater vehicle 60 (for example, a submarine 70 or an underwater excavator 80) that is movable, or a power reception device (for example, a seismometer, a surveillance camera, or a geothermal power generator) that is provided to be fixed. Each of the coils CL is disposed underwater (for example, undersea).

Examples of the submarine 70 may include a remotely operated vehicle (ROV), an unmanned underwater vehicle (UUV), and an autonomous underwater vehicle (AUV).

A part of the ship 50 is present over a water surface 90 (for example, a sea surface), that is, on the water, and other part of the ship 50 is present under the water surface 90, that is, underwater. The ship 50 is movable on the water, for example, is freely movable to on the water of a data acquisition point. The power transmission device 100 of the ship 50 and the power transmission coil CLA are connected to each other through an electrical wire 20. The electrical wire 20 is connected to, for example, a driver 151 (refer to FIG. 2) in the power transmission device 100 through a connector on the water.

The underwater vehicle 60 is present underwater or at a water bottom 95 (for example, sea bottom) and travels underwater or on the water bottom 95. For example, the underwater vehicle 60 is freely movable to a data acquisition point according to an instruction from the ship 50 on the water. The instruction from the ship 50 may be transmitted by communication through the respective coils CL, or may be transmitted using another communication method.

The respective coils CL are connected to connectors 30 and are disposed, for example, at an equal distance from each other. The distance (coil distance) between neighboring coils CL is, for example, 5 m. For example, the coil distance is the length of about half of the diameter of the coil CL. In consideration of the attenuation amount of a magnetic field intensity underwater or undersea, the transmission frequency is, for example, 40 kHz or lower and preferably lower than 10 kHz. In addition, in a case where power is transmitted at a transmission frequency of 10 kHz or higher, it is required under the regulation of the Radio Law to perform a predetermined simulation, and in a case where power is transmitted at a transmission frequency of lower than 10 kHz, this operation can be omitted. As the transmission frequency decreases, the power transmission distance increases, the size of the coils CL increases, and the coil distance increases.

The transmission frequency is determined based on coil characteristics such as the inductance of the coils CL, the diameter of the coils CL, or the winding number of the coils CL. The diameter of the coils CL is, for example, several meters to several tens of meters. In addition, as the thickness of the coils CL increases, that is, as the wire diameter of the coils CL increases, the electrical resistance of the coils CL decreases, and the electrical loss decreases. In addition, power transmitted through the coils CL is, for example, 50 W or higher and may be in the order of kW.

In FIG. 1, the number of connectors 30 is three but is not limited thereto. Weights 40 are connected to end portions of the connectors 30 on the power reception coil CLB side. Buoys 45 are connected to end portions of the connectors 30 on the power transmission coil CLA side.

The movements of the connectors 30 can be restricted by the weights 40, and the movements of the respective coils CL fixed to the connectors 30 can be restricted. Accordingly, even in a case where a water current is generated underwater, the movements of the respective coils CL are restricted by the weights 40, thereby suppressing a decrease in the efficiency of power transmission using the coils CL.

In addition, since in the connectors 30, the weights 40 are connected to the end portions on the power reception coil CLB side, and the buoys 45 are connected to the end portions on the power transmission coil CLA side, the weights 40 are on the water bottom side, the buoys 45 are on the water surface side, and a posture where the connectors 30 are substantially perpendicular to the water surface 90 can be maintained. Accordingly, surfaces defined by the respective coils CL are substantially parallel to the water surface 90 and can transmit power in a water depth direction (direction substantially perpendicular to the water surface) by means of magnetic field resonance.

The weights 40 may be removed from the connectors 30 during transport of the connectors 30 and may be attached to the connectors 3C) when being provided at predetermined positions after the end of the transport of the connectors 30. As a result, the transport of the connectors 30 is easy.

Figure 2:
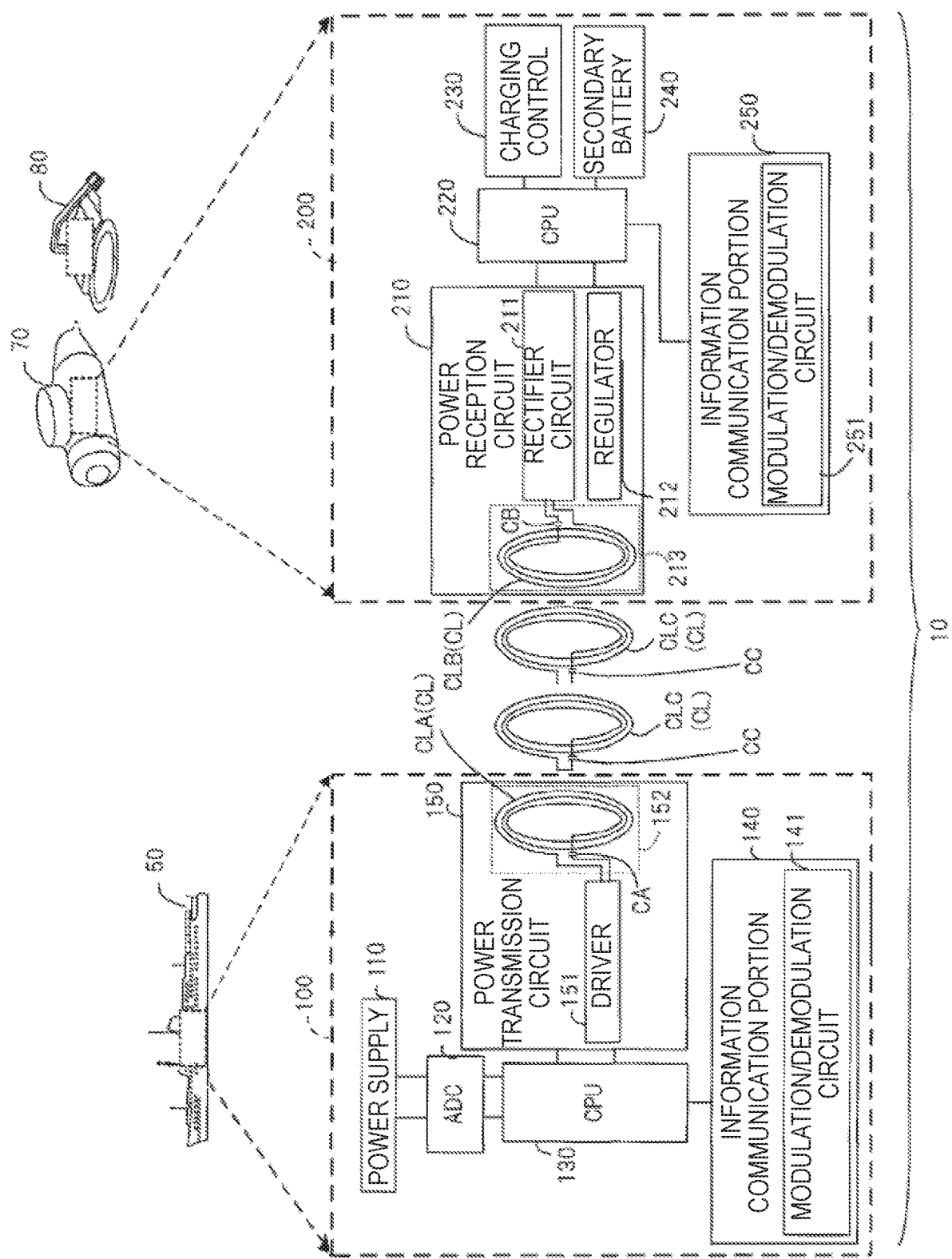
FIG. 2 is a block diagram indicating a configuration example of the power transmission system

FIG. 2 is a block diagram indicating a configuration example of the power transmission system 10. The power transmission system 10 includes the power transmission device 100 and the power reception device 200.

The power transmission device 100 includes a power supply 110, an ADC (AC/DC converter) 120, a CPU (central processing unit) 130, an information communication portion 140, and a power transmission circuit 150.

The ADC 120 converts alternating current power supplied from the power supply 110 into direct current power. The converted direct current power is supplied to the power transmission circuit 150.

The CPU 130 generally manages operations of the respective portions (for example, the power supply 110, the ADC 120, the information communication portion 140, and the power transmission circuit 150) of the power transmission device 100.

The information communication portion 140 includes a modulation/demodulation circuit 141 that modulates or demodulates communication data communicated between the information communication portion 140 and the power reception device 200. The information communication portion 140 transmits, for example, control information from the power transmission device 100 to the power reception device 200 through the coils CL. The information communication portion 140 receives, for example, data from the power reception device 200 to the power transmission device 100 through the coils CL. This data includes data regarding the results of an underwater investigation or a water-bottom investigation by the power reception device 200. By the information communication portion 140, rapid data. communication with the underwater vehicle 60 can be made while the underwater vehicle 60 performs an operation such as data collection.

The power transmission circuit 150 includes the driver 151 and a resonance circuit 152. The driver 151 converts direct current power supplied from the ADC 120 into an alternating current voltage (pulse waveform) having a predetermined frequency. The resonance circuit 152 is configured by including a capacitor CA and the power transmission coil CIA and generates an alternating current voltage having a sine waveform from the alternating current voltage having a pulse waveform supplied from the driver 151. The power transmission coil CLA resonates at a predetermined resonance frequency according to the alternating current voltage applied from the driver 151. The power transmission coil CIA is impedance-matched to an output impedance of the power transmission device 100.

The predetermined frequency relating to the alternating current voltage converted by the driver 151 corresponds to the transmission frequency of power transmission between the power transmission device 100 and the power reception device 200, and corresponds to the resonance frequency. In this embodiment, this transmission frequency is set based on the Q values of the respective coils CL. The details of the set transmission frequency will be described below.

The power reception device 200 includes a power reception circuit 210, a CPU 220, a charging control circuit 230, a secondary battery 240, and an information communication portion 250.

The power reception circuit 210 includes a rectifier circuit 211, a regulator 212, and a resonance circuit 213. The resonance circuit 213 is configured by including a capacitor CB and the power reception coil CLB, and receives an alternating current power transmitted from the power transmission coil CLA. The power reception coil CLB is impedance-matched to an input impedance of the power reception device 200. The rectifier circuit 211 converts alternating current power induced in the power reception coil CLB into direct current power. The regulator 212 converts a direct current voltage transmitted from the rectifier circuit 211 into a predetermined voltage which is suitable for charging of the secondary battery 240.

The CPU 220 generally manages operations of the respective portions (for example, the power reception circuit 210, the charging control circuit 230, the secondary battery 240, and the information communication portion 250) of the power reception device 200.

The charging control circuit 230 controls charging of the secondary battery 240 according to the kind of the secondary battery 240. For example, in a case where the secondary battery 240 is a lithium ion battery, the charging control circuit 230 start charging the secondary battery 240 at a constant voltage using the direct current power supplied from the regulator 212.

The secondary battery 240 stores power transmitted from the power transmission device 100. The secondary battery 240 is, for example, a lithium ion battery.

The information communication portion 250 includes a modulation/demodulation circuit 251 for modulating or demodulating communication data communicated between the information communication portion 250 and the power transmission device 100. The information communication portion 250 receives, for example, control information from the power transmission device 100 to the power reception device 200 through the coils CL. The information communication portion 250 transmits, for example, data from the power reception device 200 to the power transmission device 100 through the coils CL. This data includes data regarding the results of an underwater investigation or a water-bottom investigation by the power reception device 200. By the information communication portion 250, rapid data communication with the ship 50 can be made while the underwater vehicle 60 performs an operation such as data collection.

As in the power transmission coil CLA and the power reception coil CLB, the repeating coil CLC constitutes a resonance circuit with a capacitor CC. That is, in the embodiment, by disposing the resonance circuits underwater in multiple stages, power is transmitted by means of magnetic resonance.

Next, power transmission from the power transmission device 100 to the power reception device 200 will be described.

In the resonance circuit 152, in a case where a current flows through the power transmission coil CLA of the power transmission device 100, a magnetic field is generated around the power transmission coil CLA. Vibration of the generated magnetic field is transmitted to the resonance circuit including the repeating coil CLC or the resonance circuit 213 including the power reception coil CLB, which resonates at the same frequency.

In the resonance circuit including the repeating coil CLC, a current is excited by the vibration of the magnetic field in the repeating coil CLC and flows through the repeating coil CLC, so that a magnetic field is further generated around the repeating coil CLC. Vibration of the generated magnetic field is transmitted to another resonance circuit including another repeating coil CLC or the resonance circuit 213 including the power reception coil CLB that resonates at the same frequency.

In the power reception coil CLB of the resonance circuit 213, an alternating current is induced by the vibration of the magnetic field of the repeating coil CLC or the power transmission coil CLA. The induced alternating current is rectified and converted into a predetermined voltage and charges the secondary battery 240.

[Resonance Conditions of Coils]

First, a first simulation will be described.

Figure 3:
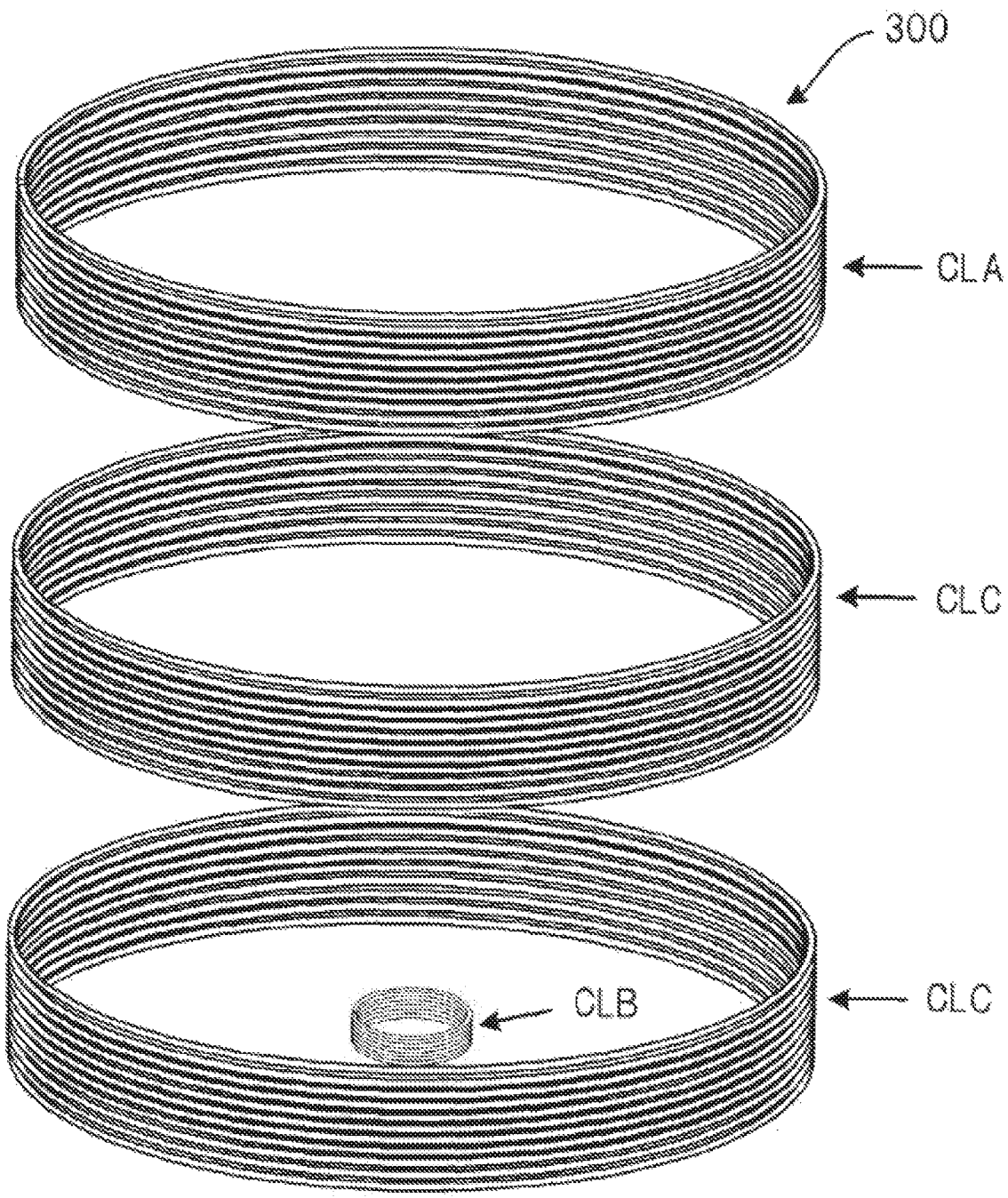
FIG. 3 is a schematic diagram indicating an example of a simulation model used in a first simulation.

FIG. 3 is a schematic diagram indicating an example of a simulation model 300 used in the first simulation. The simulation model 300 includes a coil CLα for power transmission and the power reception coil CLB. The coil CLα for power transmission is a coil used for power transmission and includes, for example, the power transmission coil CLA and the repeating coil CLC. In the first simulation, the simulation model 300 is disposed undersea to perform the simulation. In FIG. 3, for example, a y direction is a direction perpendicular to the water surface 90 and is a direction in which power is transmitted. In addition, for example, an xz plane is parallel to the water surface 90.

In the simulation model 300, regarding coil characteristics of the coil CLα for power transmission (the power transmission coil CLA and the repeating coil CLC), the diameter of the coil CLα for power transmission is 1000 mm(=1.0 m), the winding number of the coil CLα for power transmission (the power transmission coil CLA and the repeating coil CLC) is 10, and the wire diameter of the coil CLα for power transmission (the power transmission coil CIA and the repeating coil CLC) is 9.1 mm. That is, the coil characteristics of the power transmission coil CLA and the repeating coil CLC are the same. Accordingly, the power transmission coil CLA and the repeating coil CLC have, for example, the same frequency characteristics of the Q value.

In addition, regarding coil characteristics of the power reception coil CLB, the diameter of the power reception coil CLB is 150 mm(=15 cm), the winding number of the power reception coil CLB is 23, and the wire diameter of the power reception coil CLB is 2.0 mm.

The power reception coils CLB are mounted on various devices (for example, the underwater vehicle 60 described below) in many cases. Therefore, the diameter of the power reception coil CLB is less than the diameter of the power transmission coil CLA or the repeating coil CLC for power transmission in many cases. In a case where the diameter of the power reception coil CLB decreases, the inductance (L) of the coil decreases. In many cases, the winding number of the power reception coil CLB is more than that of the coil CLα for power transmission in order to suppress a decrease in inductance.

Figure 4:
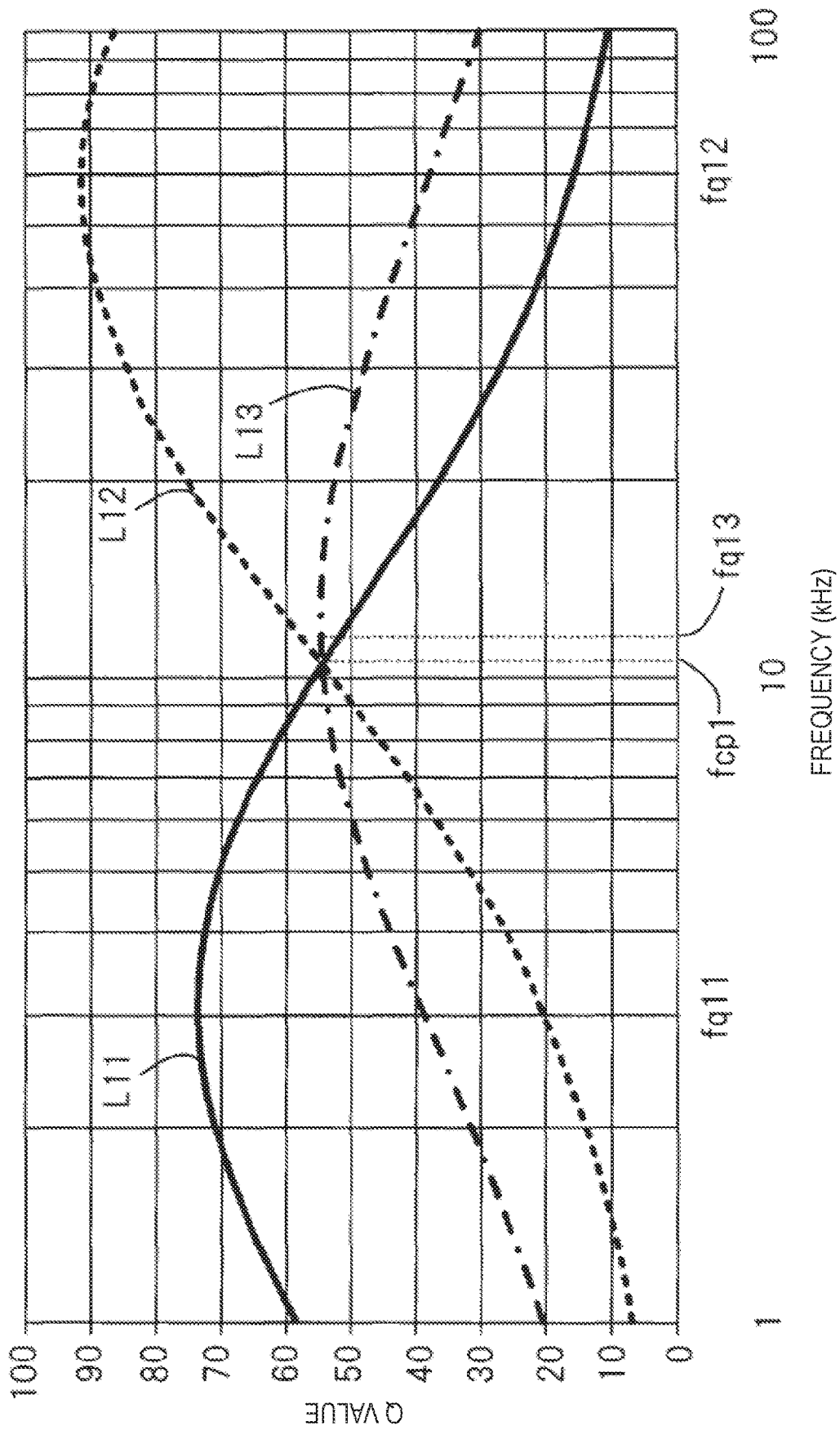
FIG. 4 is a graph indicating an example of frequency characteristics of Q values of respective coils in a case where the simulation model illustrated in FIG. 3 is used.

FIG. 4 is a graph indicating an example of frequency characteristics of Q values of respective coils in a case where the simulation model 300 is used. In FIG. 4, the horizontal axis represents the frequency, and the vertical axis represents the Q value. FIG. 4 illustrates frequency characteristics L11 of a Q value of the coil CLα for power transmission, frequency characteristics L12 of a Q value of the power reception coil CLB, and frequency characteristics L13 of an imaginary Q value described below.

The Q value represents the sharpness of a peak of resonance in the resonance circuit. Accordingly, as the Q value increases, the transmission efficiency of the coils CL is improved. The Q value is represented by the following (Expression 1) using an angular frequency ω, a resistance component R, an inductance component L, and a capacitance component C.

[Expression 1]

$$Q = \frac{\omega L}{R} = \frac{1}{\omega CR} \qquad \text{(Equation 1)}$$

In addition, the angular frequency ω is represented by the following (Expression 2) using the inductance component L and the capacitance component C.

[Expression 2]

$$\omega = \sqrt{\frac{1}{LC}} \qquad \text{(Equation 2)}$$

The imaginary Q value represented by the frequency characteristics L13 in FIG. 4 is derived based on the Q value of the coil CLα for power transmission and the Q value of the power reception coil CLB. For example, in a case where the Q value of the coil CLα for power transmission is referred to as Q1, the Q value of the power reception coil CLB is referred to as Q2, and an imaginary Q value of an imaginary coil X is referred to as Q3, Q3 is represented by the following (Expression 3). For example, Q3 as the imaginary Q value is calculated based on Q1 and Q2 at each frequency, and the frequency characteristics L13 are derived. In (Expression 3), Q3 is a geometric mean value of Q1 and Q2.

[Expression 3]

$$Q3 = \sqrt{(Q1 \times Q2)} \qquad \text{(Equation 3)}$$

It can be understood from FIG. 4 that, in the frequency characteristics L11 of the Q value(=Q1) of the coil CLα for power transmission, a maximum value of the Q value is present at a position of a relatively low frequency fq11 (for example, a frequency of 3.0 kHz). In addition, it can be understood that, in the frequency characteristics L12 of the Q value(=Q2) of the power reception coil CLB, a maximum value of the Q value is present at a position of a relatively high frequency fq12 (for example, a frequency of 59.3 kHz). In addition, it can be understood that, in the frequency characteristics L13 of the imaginary Q value(=Q3), a maximum value of the Q value is present at a position of a frequency fq13 (for example, a frequency of 12.3 kHz) in the vicinity of a frequency fcp1 (for example, a frequency of 11 kHz) as a cross point of the frequency characteristics L11 and L12, that is, in the vicinity of the frequency fcp1 at which Q1 and Q2 are the same value. The specific magnitude of the Q value depends on the coil characteristics (respective parameters relating to the coils CL) of the coils CL.

In the simulation model 300, when the coil CLα for power transmission and the power reception coil CLB are compared to each other, the diameter of the coil CLα for power transmission is more than that of the power reception coil CLB. Therefore, the inductance (L) of the coil CLω for power transmission becomes greater than that of the power reception coil CLB. Therefore, in (Expression 2), the angular frequency ω of the coil CLα for power transmission is less than that of the power reception coil CLB. Accordingly, the frequency fq11 at which the Q value of the coil CLα, for power transmission is the maximum is lower than the frequency fq12 at which the Q value of the power reception coil CLB is the maximum.

Referring to the frequency characteristics L11 to L13 of the Q values of FIG. 4, in a case where power is transmitted from the coil CLα for power transmission to the power reception coil CLB, that is, in a case where power is transmitted from the power transmission coil CLA to the power reception coil CLB through the repeating coil CLC, any one of the following three cases is assumed as the transmission frequency. Specifically, the following three cases can be considered, the cases including: a case where a frequency in the vicinity of the frequency fq11 at which the Q value of the coil CLα for power transmission increases is used; a case where a frequency in the vicinity of the frequency fq12 at which the Q value of the power reception coil CLB increases is used; and a case where a frequency in the vicinity of the frequency fq13 at which the imaginary Q value increases is used.

Figure 5:
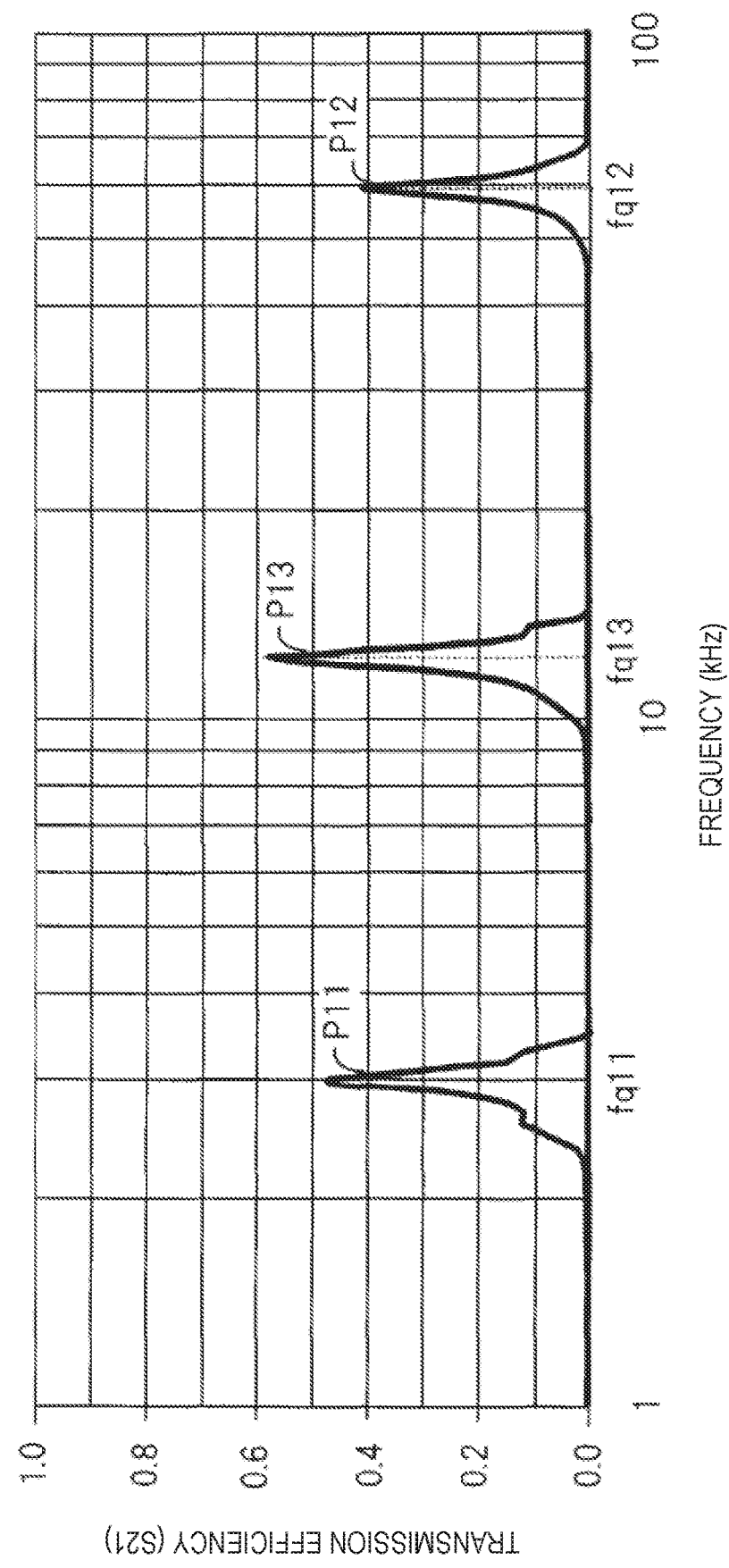
FIG. 5 is a graph indicating an example of frequency characteristics of transmission efficiencies of the respective coils in a case where the simulation model illustrated in FIG. 3 is used.

FIG. 5 is a graph indicating an example of frequency characteristics of transmission efficiencies of the respective coils in a case where the simulation model 300 is used. In FIG. 5, the horizontal axis represents the frequency, and the vertical axis represents the transmission efficiency of a current or a voltage. The transmission characteristics show a ratio of reception power of the power reception coil CLB to transmission power of the power transmission coil CLA, and correspond to a parameter S21.

In FIG. 5, a peak value P11 (for example, a value of 0.46) of the transmission efficiency appears at a position of the frequency fq11 corresponding to the maximum value of Q1. In addition, a peak value P12 (for example, a value of 0.38) of the transmission efficiency appears at a position of the frequency fq12 corresponding to the maximum value of Q2. In addition, a peak value P13 (for example, a value of 0.57) of the transmission efficiency appears at a position of the frequency fq13 corresponding to the maximum value of Q3. As the Q value increases, the transmission efficiency increases. In a case where the Q value is less by a predetermined value or more, transmission of power energy is insufficient, and power transmission is difficult.

By squaring the transmission efficiency in the vertical axis of FIG. 5, a transmission efficiency η of power is calculated. In FIG. 5, the transmission efficiency η of power at the frequency fq11 is 21.3%. The transmission efficiency η of power at the frequency fq12 is 14.8%. The transmission efficiency η of power at the frequency fq13 is 32.8%.

This way, the transmission efficiency η of power is represented by a squared value as described above. Therefore, by calculating a geometric mean value of the Q values of the respective coils, a frequency at which the transmission efficiency η increases (for example, is the maximum) can be derived.

In the simulation, various processing or various operations are performed, for example, by a CPU of a simulation device (for example, PC (Personal Computer)), the CPU 130 of the power transmission device 100, or the CPU 220 of the power reception device 200.

Referring to FIG. 5, the peak value P13 is the maximum among the peak values P11 to P13. Accordingly, it can be understood that, by selecting the frequency at which the peak value P13 as the maximum value of the transmission efficiency is obtained, that is, the frequency fq13 that is calculated from the maximum value of the frequency characteristics L13 of Q3, in the power transmission system 10, the transmission efficiency of power transmission by means of magnetic field resonance in which the coil CLα for power transmission and the power reception coil CLB are used can be maximized.

In addition, referring to FIG. 4, the position of the frequency fcp1 as the cross point where the frequency characteristics L11 of Q1 and the frequency characteristics L11 of Q2 cross each other is slightly different from the position of the frequency fq13 corresponding to the maximum value of Q3. The magnitude of Q3 at the frequency fcp1 becomes a value close to the maximum value of Q3 (that is, Q3 at the frequency fq13). Accordingly, even in a case where any frequency between the frequency fcp1 and the frequency fq13 is set as the transmission frequency, the transmission efficiency similar to the peak value P13 can be obtained, and the transmission efficiency can be improved.

Next, a second simulation will be described.

In the second simulation, different points from the first simulation will be mainly described, and the description of the same features as in the first simulation will be omitted or simplified.

Figure 6:
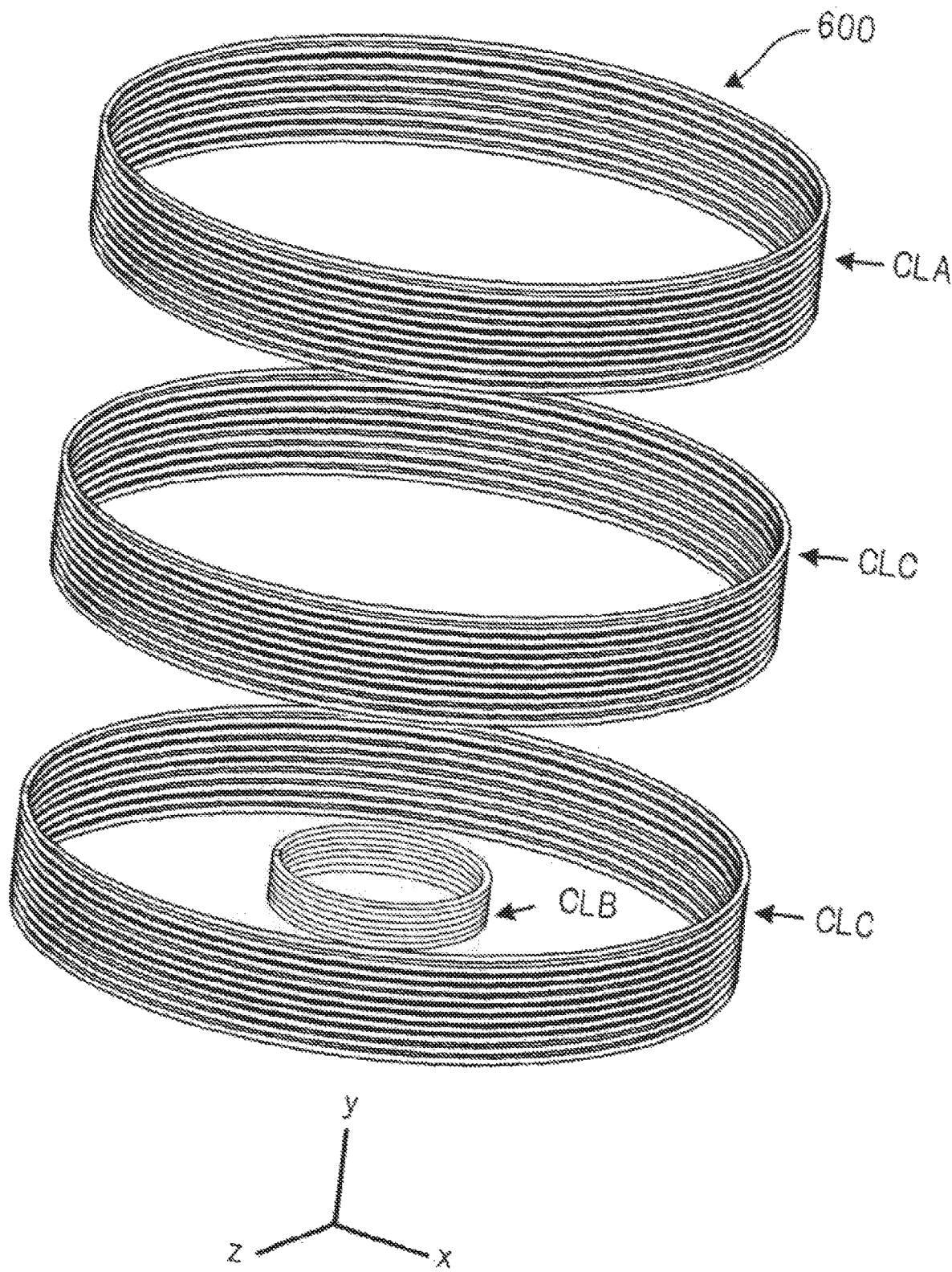
FIG. 6 is a schematic diagram indicating an example of a simulation model used in a second simulation.

FIG. 6 is a schematic diagram indicating an example of a simulation model 600 used in the second simulation. The simulation model 600 is different from the simulation model 300 in characteristics of the power reception coil CLB when comparing to the simulation model 300. Specifically, the diameter of the power reception coil CLB is 300 mm(=30 cm), the winding number of the power reception coil CLB is 10, and the wire diameter of the power reception coil CLB is 3.7 mm. That is, the size of the power reception coil CLB in the simulation model 600 is larger than that of the power reception coil CLB in the simulation model 300. Except the characteristics of the power reception coil CLB, the simulation model 600 is the same as the simulation model 300. In the second simulation, the simulation model 600 is disposed undersea to be simulated.

Figure 7:
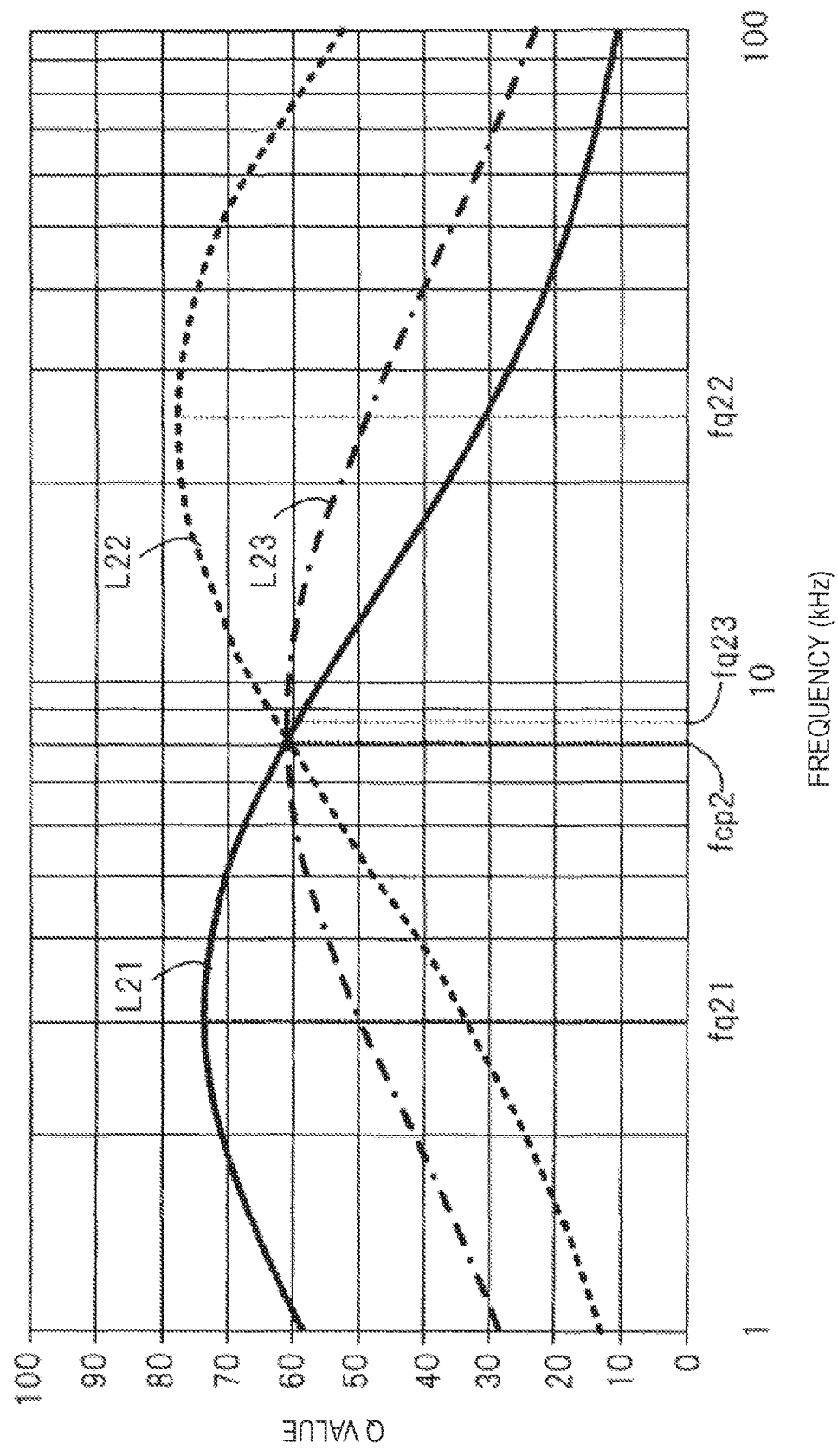
FIG. 7 is a graph indicating an example of frequency characteristics of Q values of respective coils in a case where the simulation model illustrated in FIG. 6 is used.

FIG. 7 is a graph indicating an example of frequency characteristics of Q values of respective coils in a case where the simulation model 600 is used. In FIG. 7, the horizontal axis represents the frequency, and the vertical axis represents the Q value. FIG. 7 illustrates frequency characteristics L21 of a Q value of the coil CLα for power transmission, frequency characteristics L22 of a Q value of the power reception coil CLB, and frequency characteristics L23 of an imaginary Q value. A method of calculating Q3 as the imaginary Q value is the same as in the first simulation, and Q3 is based on a geometric mean value of Q1 and Q2.

Referring to FIG. 7, the frequency characteristics L21 of the Q value(=Q1) of the coil CLα for power transmission are the same as those in the first simulation. That is, the frequency fq21 (for example, a frequency of 3 kHz) at which Q1 is the maximum is the same as the frequency fq11 in the first simulation. The coil characteristics of the coil CLα for power transmission (for example, the diameter of the coil, the winding number of the coil, and the wire diameter of the coil) are the same in the both simulations.

On the other hand, when the frequency characteristics L22 of the Q value(=Q2) of the power reception coil CLB is compared with the frequency characteristics L12 of Q2 in the first simulation, the frequency fq22 (for example, a frequency of 25 kHz) at which Q2 is the maximum decreases, and the maximum value of Q2 also decreases.

In addition, the frequency characteristics L23 of the imaginary Q value(=Q3) depends on the frequency characteristics L22 of Q2, and thus are different from those in the first simulation. The reason for this is that the frequency characteristics L11 and 122 of Q2 vary between the first and second simulations. Specifically, as the frequency fq22 at which Q2 is the maximum moves toward the low frequency side, in the frequency characteristics L23 of Q3, the frequency fq23 (for example, a frequency of 8.5 kHz) at which Q3 is the maximum decreases. In addition, the maximum value of Q3 increases. In addition, the position of the frequency fcp2 (for example, a frequency of 8 kHz) of the cross point of the frequency characteristics L22 and L23 also moves to the lower frequency side than in the first simulation.

Figure 8:
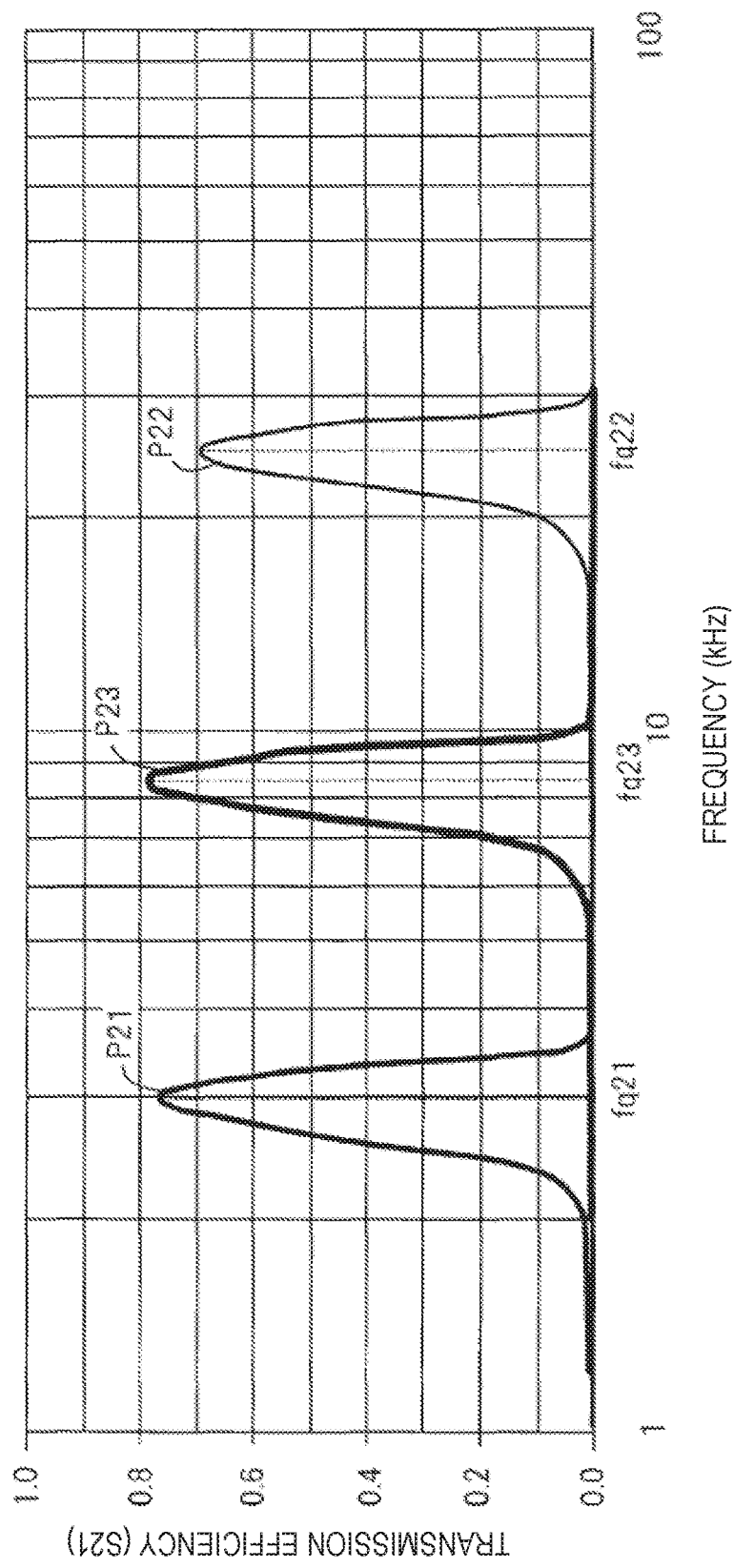
FIG. 8 is a graph indicating an example of frequency characteristics of transmission efficiencies of the respective coils in a case where the simulation model illustrated in FIG. 6 is used.

FIG. 8 is a graph indicating an example of frequency characteristics of transmission efficiencies of the respective coils in a case where the simulation model 600 is used. In FIG. 5, the horizontal axis represents the frequency, and the vertical axis represents the transmission efficiency of a current or a voltage. As in the case of the first simulation, the transmission characteristics show a ratio of reception power of the power reception coil CLB to transmission power of the power transmission coil CLA, and correspond to an S21 parameter.

In FIG. 8, a peak value P21 (for example, a value of 0.76) of the transmission efficiency appears at a position of the frequency fq21 corresponding to the maximum value of Q1. In addition, a peak value P22 (for example, a value of 0.70) of the transmission efficiency appears at a position of the frequency fq22 corresponding to the maximum value of Q2. In addition, a peak value P23 (for example, a value of 0.78) of the transmission efficiency appears at a position of the frequency fq23 corresponding to the maximum value of Q3.

In FIG. 8, the transmission efficiency η of power at the frequency fq21 is 58.3%. The transmission efficiency η of power at the frequency fq22 is 48.5%. The transmission efficiency η of power at the frequency fq23 is 61.6%.

Referring to FIG. 8, the peak value P23 is the maximum among the peak values P21 to P23. Accordingly, it can be understood that, by selecting the frequency at which the peak value P23 as the maximum value of the transmission efficiency can be obtained, that is, the frequency fq23 that is calculated from the maximum value of the frequency characteristics L23 of Q3, the transmission efficiency of power transmission by means of magnetic field resonance in which the coil CLα for power transmission and the power reception coil CLB are used can be maximized.

In addition, referring to FIG. 8, the position of the frequency fcp2 of the cross point where the frequency characteristics L21 of Q1 and the frequency characteristics L22 of Q2 cross each other is slightly different from the position of the frequency fq23 corresponding to the maximum value of Q3. The magnitude of Q3 at the frequency fcp2 is close to the maximum value of Q3 (that is, Q3 at the frequency fq23). Accordingly, even in a case where any frequency between the frequency fcp2 and the frequency fq23 is set as the transmission frequency, the transmission efficiency similar to the peak value P23 can be obtained, and the transmission efficiency can be improved.

Next, the frequency characteristics of the Q value for each conductivity will be described.

Figure 9:
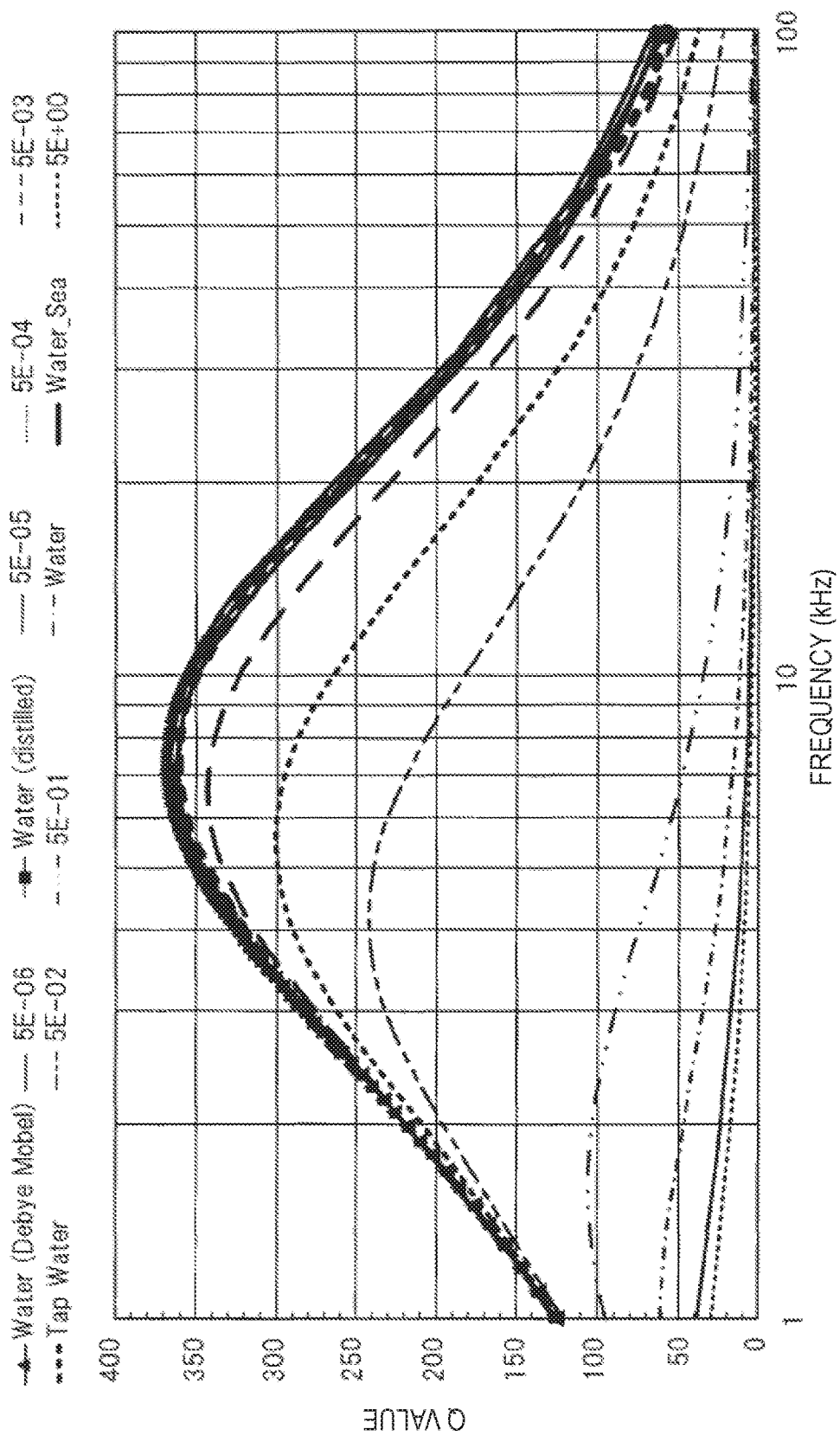
FIG. 9 is a graph indicating an example of frequency characteristics of Q values of the coils for each medium in which the coils are disposed.

FIG. 9 is a graph indicating an example of frequency characteristics of Q values of the coils CL for each medium in which the coils CL is disposed. Since the conductivity varies depending on the media, it can also be said that FIG. 9 is a graph indicating the frequency characteristics of the Q values of the coils CL depending on conductivity. In FIG. 9, the media include Debye model water "Water (Debye Model)", distilled water "Water (distilled)", typical water (for example, tap water) "Water", Sea water "Water_sea", and other media. The frequency characteristics relating to the Debye model water, the distilled water, the typical water, and the sea water are obtained using default material characteristics belonging to a simulator (device for simulating the frequency characteristics of the Q values of the coils CL for each medium). In addition, in FIG. 9, frequency characteristics relating to tap water measured by a conductivity meter is illustrated as "Tap Water". Regarding the characteristics of the coils CL for obtaining the results of FIG. 9, the diameter of the coils CL was 4.0 m, the wire diameter of the coils was 23.6 mm, and the winding number of the coils was 5.

It can be understood from FIG. 9 that the frequency characteristics of the Q values of the coils vary depending on media. Accordingly, it can be understood that, in a case where the first simulation and the second simulation are performed, for example, underwater instead of undersea, the obtained Q values change and increase.

It can be understood that, in a case where the Q values of the coil CLα for power transmission and the power reception coil CLB change as described above in the first simulation and the second simulation, the position of the frequency fq13 or fq23 at which Q3 is the maximum and the position of the frequency fcp1 or fcp2 of the cross point at which Q1 and Q2 are the same can also change. In addition, it can be understood that, even in a case where the position of the frequency changes as described above, a high transmission efficiency can be obtained at any frequency between the frequency fq13 or fq23 where Q3 is the maximum and the frequency fcp1 or fcp2 of the cross point. In addition, it can be understood that the Q values vary depending on media.

[Effects and the Like]

As described above, the power transmission device 100 transmits power to the power reception device 200 including the power reception coil CLB underwater. The power transmission device 100 includes: the power transmission coil CLA that transmits power to the power reception coil CLB through a magnetic field; the driver 151 that transmits an alternating current power having a predetermined frequency (for example, 11 kHz to 12.3 kHz, 8 kHz to 8.5 kHz) to the power transmission coil CLA; and the capacitor CA that is connected to the power transmission coil CLA and forms the resonance circuit 152 resonating with the power transmission coil CLA. The predetermined frequency is a frequency between the frequency fq13 or fq23 at which a geometric mean value (for example, Q3) of a Q value (for example, Q1) of the power transmission coil CIA and a Q value (for example, Q2) of the power reception coil CLB is the maximum and the frequency fcp1 or fcp2 at which the Q value of the power transmission coil CLA and the Q value of the power reception coil are the same.

The driver 151 is an example of the power transmitter. The capacitor CA is an example of the first capacitor. Q1 is an example of the Q value of the power transmission coil CLA. Q2 is an example of the Q value of the power reception coil CLB. Q3 is an example of the geometric mean value of Q1 and Q2, that is, the imaginary Q value calculated from (Expression 2). The frequency fq13 or fq23 is an example of the first frequency. The frequency fcp1 or fcp2 is an example of the second frequency.

As a result, in the power transmission device 100, the transmission efficiency of power transmission can be improved by determining the frequency (transmission frequency) for power transmission in consideration of the geometric mean value of the Q value of the power transmission coil CLA and the Q value of the power reception coil CLB.

By selecting a frequency at which the Q value of the power transmission coil CLA is in the vicinity of the maximum value as the transmission frequency, the transmission efficiency of the power transmission coil CLA can be improved, but the transmission efficiency of the power reception coil CLB decreases. On the other hand, by selecting a frequency at which the Q value of the power reception coil CLB is in the vicinity of the maximum value as the transmission frequency, the transmission efficiency of the power reception coil CLB can be improved, but the transmission efficiency of the power transmission coil CLA decreases. That is, the transmission frequency that is suitable for the power transmission side is different from the transmission frequency that is suitable for the power reception side.

On the other hand, by selecting a frequency at which the average value (geometric mean value) of the Q value of the power transmission coil CLA and the Q value of the power reception coil CLB is in the vicinity of the maximum value as the transmission frequency in the power transmission device 100, the overall transmission efficiency of the power transmission system 10 can be improved in consideration of the different Q values of the plurality of coils CL.

In addition, the predetermined frequency may be the frequency fq13 or fq23. As a result, in the power transmission device 100, the value of Q3 in the entire frequency band is the maximum. Therefore, the transmission efficiency of power transmission using the power transmission coil CLA and the power reception coil CLB can be maximized.

In addition, the power transmission device 100 may include: at least one repeating coil CLC that transmits power to the power reception coil CLB using a magnetic field generated from the power transmission coil CLA; at least one capacitor CC that is connected to the repeating coil CLC and forms a resonance circuit resonating at the frequency with the repeating coil CLC and the connector 30 that connects the power transmission coil CLA and the repeating coil CLC to each other. Frequency characteristics of a Q value of the repeating coil CLC may be the same as frequency characteristics of the Q value of the power transmission coil CLA. The capacitor CC is an example of the second capacitor.

As a result, in the power transmission device 100, the Q value of the power transmission coil CLA and the Q value of the repeating coil CLC are the same, so that characteristics relating to the power transmission of the power transmission coil CLA are the same and transmission loss between the power transmission coil CLA and the repeating coil CLC can be reduced. In addition, in the power transmission device 100, a frequency at which the average value (geometric mean value) of the Q value of the repeating coil CLC and the Q value of the power reception coil CLB is in the vicinity of the maximum value is selected as the transmission frequency. Therefore, transmission loss between the repeating coil CLC and the power reception coil CLB can also be reduced.

In addition, the power transmission coil CLA may transmit power in a direction substantially perpendicular to the water surface 90.

As a result, the power transmission device 100 can extend the power transmission distance in the water depth direction, can supply power to the power reception device 200 positioned at a deep water position (for example, deep sea), and can improve the operation efficiency of the power reception device 200.

In addition, the power transmission coil CLA may transmit not only the power but also data.

As a result, the power reception device 200 can be charged using power supplied from the power transmission device 100, and can communicate data with the power transmission device 100 while suppressing a decrease in the efficiency of an operation such as data collection.

In addition, according to the power transmission device 100 and the power transmission system 10, even in an environment where an underwater flow is present, it is not necessary that the power reception device 200 (for example, the underwater vehicle 60) is in contact with the power transmission coil CLA, a decrease in the efficiency of power transmission by means of magnetic resonance can be suppressed, and power can be stably received. Accordingly, the underwater vehicle 60 can continuously receive power supply while performing an operation such as data collection, and the operating rate of the underwater vehicle 60 is improved when receiving power supply. Thus, the power transmission device 100 can improve the efficiency of the underwater data collection operation.

In addition, by using the power transmission coil CLA of the power transmission device 100 and the power reception coil CLB of the power reception device 200, the power transmission device 100 can wirelessly transmit power by means of magnetic resonance. In addition, in the power transmission device 100, the underwater vehicle 60 can receive power without moving to a predetermined power supply position. Therefore, the underwater vehicle 60 can freely move even during power feeding, and position-free power transmission can be performed. Accordingly, the power transmission device 100 can suppress an interference with the operation of the underwater vehicle 60 underwater or at the water bottom 95. Thus, the operation range of the underwater vehicle 60 can be widened even during charging, and the underwater vehicle 60 can be continuously charged even during an operation. In addition, the underwater vehicle 60 can be charged at an arbitrary timing, and thus the operation can be reduced.

In addition, by using the repeating coil CLC, the power transmission device 100 can extend the power transmission distance by continuous electromagnetic induction. For example, by disposing the repeating coils CLC in multiple stages in a direction from the vicinity of the water surface 90 to the water bottom as illustrated in FIG. 1, the power transmission device 100 can transmit power up to a deep water position (for example, a water depth of 1000 m or more). In this case, the power transmission device 100 can wirelessly transmit power to the underwater vehicle 60 that performs a mining operation or an investigation of sea bottom resources, and a decrease in the operating rate of the underwater vehicle 60 during power feeding can be suppressed.

In addition, even in a case where the underwater vehicle 60 does not include a large battery for operating without receiving power supply, the underwater vehicle 60 can operate. In this case, the size and weight of the underwater vehicle 60 can be reduced.

Other Embodiments

As described above, the first embodiment has been described as an example of the technique of the present disclosure. However, the technique of the present disclosure is not limited to the embodiment and is also applicable to embodiments in which changes, substitutions, additions, omissions, or the like are made.

Figure 10:
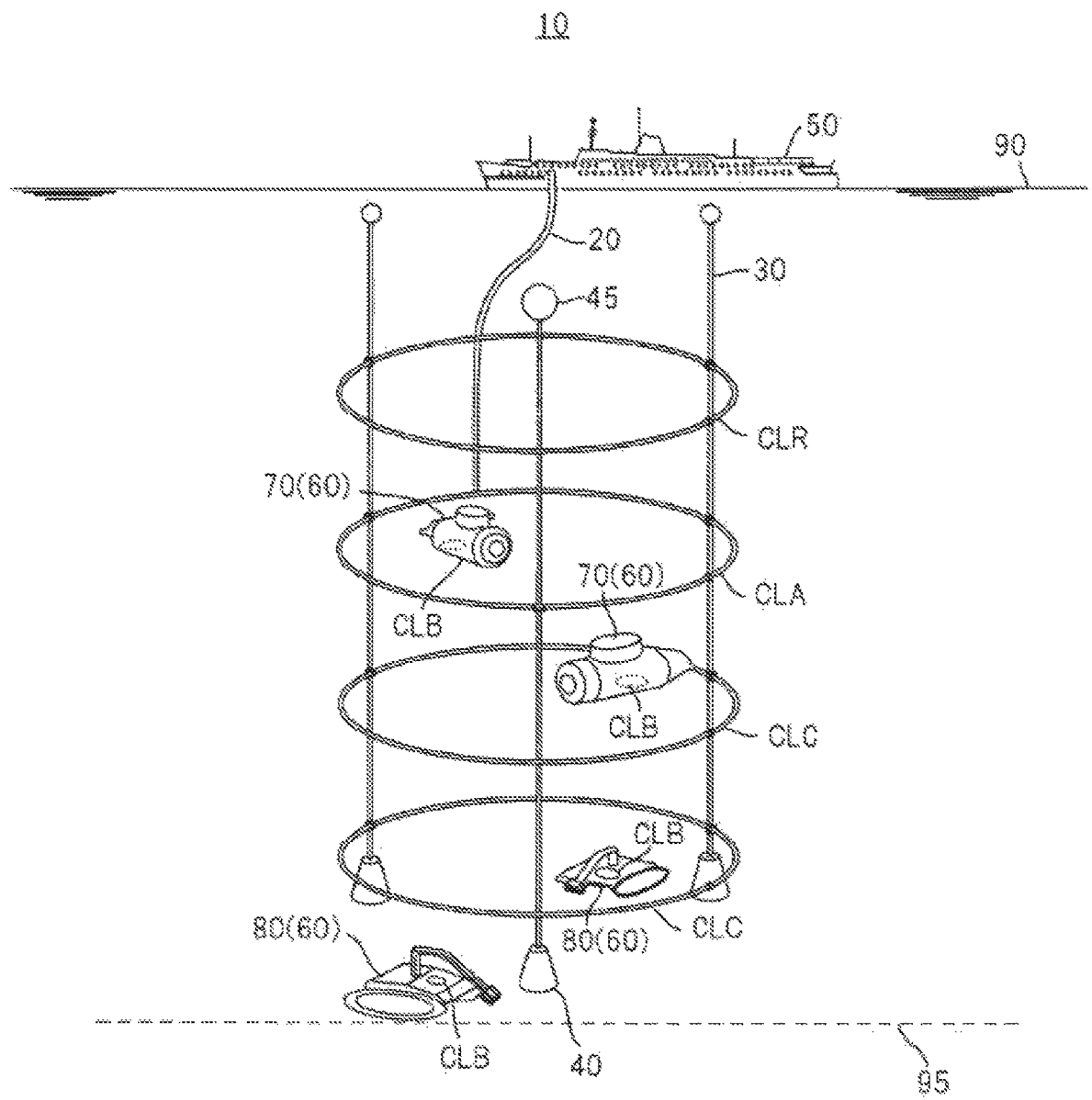
FIG. 10 is a schematic diagram indicating an example of an environment in which a power transmission system including a reflection coil is provided.

In the embodiment, the power transmission system 10 may include a reflection coil CLR as a coil CLα for power transmission. In this case, the reflection coil CLR is disposed between the power transmission coil CLA and the water surface 90. The reflection coil CLR reflects a magnetic field, which is emitted in a direction from the power transmission coil CLA to the water surface 90, in a direction to the water bottom 95. FIG. 10 is a schematic diagram indicating an example of an environment in which a power transmission system 10 including the reflection coil CLR is provided.

By providing the reflection coil CLR, the emission of the magnetic field emitted from the power transmission coil CLA, from the water surface 90 can be suppressed. Accordingly, in the power transmission system 10, an interference between the magnetic field emitted from the power transmission coil CLA and communication in a very low frequency (VLF) band or an ultra-low frequency (ULF) band over or under the water can be suppressed. Thus, the power transmission system 10 includes the refection coil CLR, so that the transmission efficiency of power transmitted from the power transmission coil to the power reception coil can be improved.

In the reflection coil CLR, it is necessary to avoid resonance with the power transmission coil CLA. Therefore, unlike the power reception coil CLB or the repeating coil CLC, the reflection coil CLR is not connected to a capacitor, and a resonance circuit is not formed. That is, the reflection coil CLR forms a closed loop having no capacitor.

In addition, on an inner side of the reflection coil CLR illustrated in FIG. 10, a second reflection coil having a coil diameter less than that of the reflection coil GER may be disposed concentrically with the reflection coil CLR. As a result, the area in which the magnetic field emitted from the power transmission coil CLA can be reflected in the direction to the water bottom increases, and thus the emission of the magnetic field from the water surface 90 can be more reliably suppressed. In addition, three or more reflection coils CLR may be provided.

In the first embodiment, the example in which the underwater vehicle 60 can be charged underwater by including the secondary battery 240 has been described. However, the underwater vehicle 60 does not necessarily include the secondary battery 240. Even in this case, the underwater vehicle 60 can receive power supply through the respective coils CL, that is, is capable of underwater power feeding.

In the first embodiment, an underwater camera system that performs data collection or the like underwater or on the sea bottom has been described as the power transmission system 10. However, the power transmission system 10 is also applicable to other uses. For example, the power reception device 200 may be provided in an underwater robot or an unmanned probe including various sensors, and then the underwater robot or the unmanned probe may be disposed underwater or on the water bottom 95. As a result, using the underwater robot or the unmanned probe, management of aquatic resources or aquaculture, maintenance management of infrastructure systems such as bridges or dams, or sea bottom monitoring at ports and the like can be performed.

In the first embodiment, the example in which the power transmission coil CLA, the repeating coils CLC, and the power reception coil CLB are disposed side by side in the direction from the water surface 90 to the water bottom 95 has been described. However, the direction of disposing the coils CL is not limited to the example. For example, the power transmission coil CLA, the repeating coils CLC, and the power reception coil CLB may be disposed side by side in a direction along the water surface 90 or the water bottom 95. As a result, the power transmission device 100 can transmit power underwater in a horizontal direction.

In the first embodiment, the example in which the power transmission coil CLA, the repeating coils CLC, and the power reception coil CLB are disposed side by side in the direction from the water surface 90 to the water bottom 95 has been described. However, this order may be reversed. That is, the power transmission coil CLA, the repeating coils CLC, and the power reception coil CLB may be disposed side by side in a direction from the water bottom 95 to the water surface 90. For example, by using a geothermal power generator as the power supply 110 of the power transmission device 100, the geothermal power generator may be connected to the power transmission coil CLA through the electrical wire 20.

In addition, the power transmission device 100 is not necessarily provided in the ship 50. For example, a part of the power transmission device 100 may be mounted on various power generators (for example, a photovoltaic power generator, a wind power generator, or a wave power generator) provided on the water (a part of which may be provided underwater), various power generators (geothermal power generator) provided underwater or on the water bottom 95, or other power supplies. For example, various power generators may be used as the power supply 110 of the power transmission device 100.

In the first embodiment, the CPU 130 and 220 have been described as an example. However, a processor other than the CPU 130 or 220 may be used. The processor may have any physical configuration. In addition, in a case where a programmable processor is used, processing details can be changed by changing a program. Therefore, the degree of freedom in designing the processor can be improved. The processor may be configured by one semiconductor chip or may be physically configured by a plurality of semiconductor chips. In a case where the processor is configured by a plurality of semiconductor chips, the respective controls of the first embodiment may be realized by different semiconductor chips, respectively. In this case, it can be considered that the plurality of semiconductor chips configure one processor. In addition, the processor may be configured by a member (for example, a capacitor) having a function different from that of a semiconductor chip. In addition, one semiconductor chip may be configured to realize a function of the processor and another function.

The present invention has been described in detail with reference to the specific embodiments. However, it is obvious to those skilled in the art that various changes and modifications can be made without departing from the spirit and scope of the present invention.

The present application is based on Japanese Patent Application No. 2016-130997, filed on Jun. 30, 2016, the contents of which are incorporated herein by reference.

INDUSTRIAL APPLICABILITY

The present disclosure is useful to, for example, a power transmission device capable of improving a transmission efficiency of underwater contactless power transmission to a power reception device.

REFERENCE SIGNS LIST

10: power transmission system
20: electrical wire
30: connector
40: weight
45: buoy
50: ship
60: underwater vehicle
70: submarine 80: underwater excavator
90: water surface
95: water bottom
100: power transmission device
110: power supply
120: ADC
130: CPU
140: information communication portion
141: modulation/demodulation circuit
150: power transmission circuit
151: driver
152: resonance circuit
200: power reception device
210: power reception circuit
211: rectifier circuit
212: regulator
220: CPU
230: charging control circuit
240: secondary battery
250: information communication portion
251: modulation/demodulation circuit
300, 600: simulation model
CL: coil
CLA: power transmission coil
CLB: power reception coil
CLC: repeating coil
CLR: reflection coil
CA, CB, CC: capacitor

The invention claimed is:

1. A power transmission device that transmits power underwater to a power reception device including a power reception coil, the power transmission device comprising:
   a power transmission coil that transmits power to the power reception coil through a magnetic field;
   a power transmitter that transmits an alternating current power having a predetermined frequency to the power transmission coil; and
   a first capacitor that is connected to the power transmission coil and forms a resonance circuit resonating with the power transmission coil, wherein
   the predetermined frequency is a frequency between a first frequency at which a geometric mean value of a Q value of the power transmission coil and a Q value of the power reception coil are the maximum and a second frequency at which the Q value of the power transmission coil and the Q value of the power reception coil are the same.

2. The power transmission device according to claim 1, wherein the predetermined frequency is the first frequency.

3. The power transmission device according to claim 1, further comprising:
   at least one repeating coil that transmits power to the power reception coil using a magnetic field generated from the power transmission coil;
   at least one second capacitor that is connected to the repeating coil and forms a resonance circuit resonating at the frequency with the repeating coil; and
   a connector that connects the power transmission coil and the repeating coil to each other, wherein
   frequency characteristics of a Q value of the repeating coil are the same as frequency characteristics of the Q value of the power transmission coil.

4. The power transmission device according to claim 1, wherein the power transmission coil transmits power in a direction substantially perpendicular to a water surface.

5. The power transmission device according to claim 1, wherein the power transmission coil transmits not only the power but also data.

\* \* \* \* \*